April 18, 1961 P. KARDOS 2,980,780
THERMOSTAT DEVICE
Filed March 27, 1958 2 Sheets-Sheet 1

INVENTOR.
PETER KARDOS
BY Hudson, Boughton,
Williams, David & Hoffmann
ATTORNEYS April 18, 1961  P. KARDOS  2,980,780
THERMOSTAT DEVICE Filed March 27, 1958  2 Sheets-Sheet 2

INVENTOR.
PETER KARDOS
BY Hudson, Boughton,
Williams, David & Hoffmann
ATTORNEYS United States Patent Office 2,980,780
Patented Apr. 18, 1961

2,980,780

THERMOSTAT DEVICE

Peter Kardos, Cleveland Heights, Ohio, assignor to Morrison Products, Inc., Cleveland, Ohio, a corporation of Ohio Filed Mar. 27, 1958, Ser. No. 724,318

7 Claims. (Cl. 200—138)

This invention relates to a novel thermostat device of a kind suitable for use in a combined blower and heat-exchanger unit. The combined unit may, for example, be one intended for use as a component, usually a remotely located component, of a refrigerating or air conditioning installation. This invention relates more particularly to a novel form of thermostat device embodying a plurality of electric switches.

A remotely located air-cooled condenser is frequently employed in air conditioning or refrigerating systems and is commonly used in conjunction with an air impelling means of a substantially constant output. The condenser is therefore sensitive to temperature changes in the atmospheric air being used for cooling the same and, as the result of such temperature changes, the heat-exchange capacity of the condenser may vary to a sufficient extent to cause serious difficulties in the functioning of the system of which it forms a part. Attempts have been made to maintain the capacity of the condenser substantially constant by automatically varying, in response to ambient temperature changes, the amount of cooling air being moved through the condenser core by providing in association with the latter an air impelling means, preferably a variable speed impelling means, and a power actuated damper means controlling the air output of the impelling means.

As one of its objects this invention provides a novel thermostat device embodying electric switch means and which can be used, for example, to control the air impelling means associated with the condenser of an air conditioning or refrigerating unit.

Another object is to provide a novel thermostat device embodying a plurality of electric switches and which can be used, for example, to control both the electric driving motor and the power actuated damper of an air impelling means.

A further object is to provide a novel thermostat device having switch means comprising a pair of switches, and a temperature responsive means having a movable portion carrying the switches and movable in opposite directions away from a neutral position for causing selective actuation of the switches.

As still another object, this invention provides such a novel thermostat device whose switch means also comprises a third switch located for co-operable engagement by the movable portion of the temperature responsive means.

Yet another object is to provide a novel thermostat of the character mentioned above wherein the temperature responsive means if of the bimetal type, and the pair of switches are mercury-type switches so disposed that both switches are open when the movable portion of the temperature responsive means is at the neutral position.

Additionally, this invention provides such a thermostat device having novel adjusting means for calibrating the device to adapt the same for use with a particular design of heat-exchange core and/or air impelling means.

Other objects and advantages of this invention will be apparent in the following detailed specification and in the accompanying drawings forming a part thereof and wherein Fig. 1 is a vertical longitudinal section taken through a blower and heat-exchanger unit using the novel thermostat device of the present invention;

Figure 1:
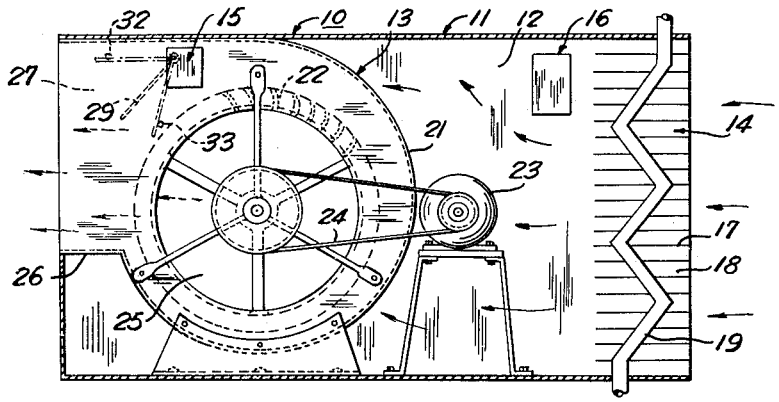

As representing one kind of apparatus or environment in which the novel thermostat device 16 of this invention can be used, Fig. 1 shows a blower and heat-exchanger unit 10 adapted for use in an air conditioning or refrigerating system and adapted for location at a suitable point, usually a relatively remote point, where a flow of cooling atmospheric air will be available. The unit 10 comprises, in general, a suitable housing 11 containing an air space or passage 12, an air impelling device 13 operable to move air through the passage, and a heat-exchanger core or condenser 14 located to be traversed by the stream of air. The unit 10 also comprises a power actuated damper means 15 associated with the air impelling means 13 for controlling the amount of air traversing the core 14, and the novel thermostat device 16 controlling the operation of the damper means 15 and located on the air discharge side of the core 14 so as to be responsive to changes in the ambient temperature in the housing 11.

The heat-exchanger core 14 is of a conventional construction, as by having radiating fins 17 and air passages 18 between the fins, and also includes a conduit or coil 19 for the confined heat-exchange medium being supplied to the core. The core 14 is here shown as being located at the inlet end of the passage 12 of the housing 11 so as to be traversed by the air being drawn into the housing by the impelling means 13. The core 14 will usually be the above-mentioned remotely located condenser of an air conditioning or refrigerating system and which is desired to be cooled by the flow of atmospheric air therethrough, and the unit 10 is described hereinafter with reference to such a condenser as the heat-exchange core.

The air impelling means 13 is here shown as being a blower located in the housing 11 and comprising a scroll-shaped blower casing 21 and a centrifugal blower wheel 22 rotatable in the casing and driven by an electric motor 23 through a belt or the like 24. The blower casing 21 is provided with one or more air inlet openings 25 in communication with the passage 12 and a nozzle portion 26 having a delivery passage 27 in open communication with the atmosphere.

Figure 2:
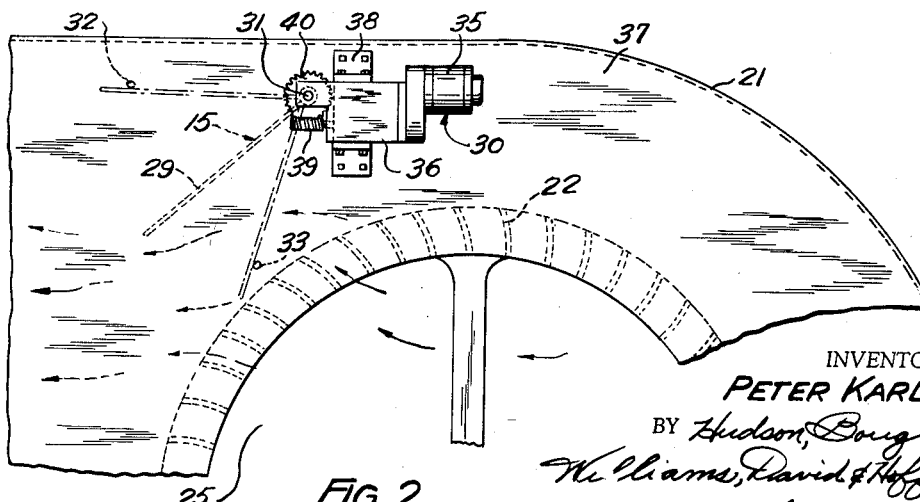
Fig. 2 is a fragmentary elevational view corresponding with a portion of Fig. 1 but on a larger scale and showing the power actuated damper means of the air impelling means.

The power actuated damper device 15 forms a part of the blower 13 and is further illustrated in Fig. 2 as comprising a swingable damper 29 located in the air delivery passage 27 of the blower and a power device or servomotor device 30 for moving the damper. The damper 29 is swingably supported by a transverse pivot shaft 31 and is movable thereby to different control positions in the delivery passage 27. The extent of movement of the damper 29 in opposite directions to open and closed positions is limited by suitably located stop pins 32 and 33.

The power device 30 for actuating the damper 29 comprises a suitable electric driving motor 35, preferably a reversible motor, and a conventional gear reduction unit 36 with which the motor is connected. The power device 30 is suitably mounted on the side wall 37 of the blower casing 21 as by means of brackets 38. The reduction gearing 36, as here shown, includes a rotatable driving worm or the like 39 in meshed engagement with a worm wheel or gear 40 secured on the damper shaft 31.

When the driving motor 35 of the power device 30 is energized to run in one direction, the damper 29 will be swung in the opening direction toward the stop pin 32 to produce less restriction of the discharge passage 27 of the blower 13 and thereby cause an increased amount of cooling air to be moved through the core 14. Conversely when the driving motor 35 is energized to run in the opposite direction, the power device 30 causes swinging of the damper 29 in a closing direction toward the stop pin 33 to restrict the discharge passage 27 of the blower 13 and thereby decrease the amount of cooling air traversing the core 14.

Figure 3:
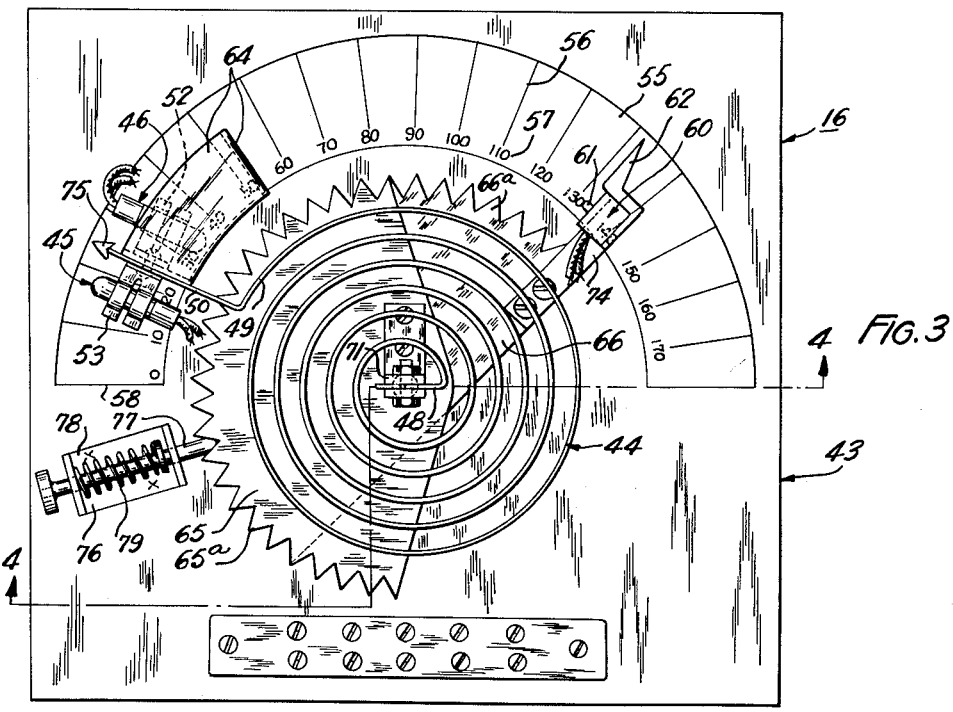
Fig. 3 is an elevation of a thermostat device forming one of the components of the unit shown in Fig. 1.
Figure 4:
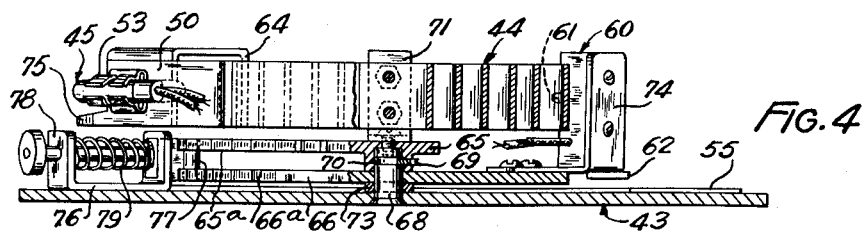
Fig. 4 is a sectional view taken through the thermostat device as indicated by the irregular section line 4—4 of Fig. 3.

The thermostat device 16 is of a novel construction which is further illustrated in Figs. 3 and 4 of the drawings and comprises a supporting means or plate 43, a bimetal temperature responsive element 44, and a pair of switch devices 45 and 46 for controlling the energization and operation of the power device 30 of the damper means 15. The thermostat device 16 has a normal operating position with the support plate 43 thereof in an upright or vertical position and is located in this relation in the air passage 12 of the unit 10, as by having the support plate secured against one of the side walls of the housing 11. The thermostat device 16 is located in the housing 11 so as to be on the discharge side of the core 14 as has been mentioned above, and the bimetal element 44 is responsive to changes in the ambient temperature of the housing passage 12 and which ambient temperature is, in turn, variable in accordance with variations in the temperature of the air leaving the core 14.

The bimetal element 44 is here shown as being a spiral element having a held inner end 48 and a free outer end 49. The held inner end 48 is connected with the support plate 43 in a manner to be presented presently, and the free outer end 49 has a substantially radially disposed arm 50 connected therewith and arcuately movable thereby in response to temperature effects on the bimetal element. The control switches 45 and 46 are carried by the arm 50 as by means of suitable mounting brackets 52 and 53 located on opposite sides thereof and suitably attached thereto.

The thermostat device 16 also includes a calibrating or reference scale 55 mounted on the support plate 43 and extending arcuately adjacent the bimetal element 44. The scale 55 carries suitable graduations 56 and temperature indications 57, and is also provided with a zero line or reference line 58 located at or representing a neutral position for the arm 50 of the bimetal element 44. The neutral position 58 is located on a horizontal radial line which extends through the point of connection of the held inner end 48 with the support plate 43.

The control switches 45 and 46 are preferably of the mercury type actuatable by tilting thereof and are contained in the energizing circuits of the power device 30 of the damper means 15 so that the switch 45 controls the energization or running of the motor 35 for swinging the damper 29 in its opening direction to or toward the stop pin 32, and the switch 46 controls the energization or running of the motor 35 for swinging the damper 29 in a closing direction to or toward the stop pin 33.

The switch 45 is mounted on the arm 50 so that the desired circuit control actuation or closing of this switch will be produced by swinging of the arm 50 in a clockwise direction for a predetermined distance away from its neutral position 58. The switch 46 is mounted on the arm 50 so that the desired circuit control actuation or closing of this switch will be produced by a counterclockwise movement of the arm 50 for a predetermined distance away from the neutral position 58. The switches 45 and 46 are also mounted on the arm 50 in such a canted or tilted relation thereto that both switches will be in a desired given condition of actuation or open position when the arm 50 is at the neutral position 58.

The electric driving motor 35 of the power device 30 is preferably of a type which will be subject to stalling without damage if and when the damper 29 comes into engagement with one of the stop pins 32 and 33 before the motor has been de-energized by opening of one or the other of the control switches 45 and 46. The motor 30 can accordingly be either a shaded-pole motor or a synchronous motor, or any other suitable form of electric driving machine which will not be subject to damage by continued energization thereof while the motor is stalled by the load imposed thereon.

From the construction of the thermostat device 16, as thus far described, it will be seen that when the ambient temperature in the passage 12 of the housing 11 increases, due either to an increased amount of cooling needed by the core 14 or to an inadequate amount of cooling air being moved through the core, the element 44 will respond to such increase in ambient temperature and will cause swinging of the arm 50 in a clockwise direction away from the neutral position 58 thereby causing closing actuation of the switch 45 while the switch 46 remains open. The closing of the switch 45 will cause energization and running of the power device 30 in a direction to cause opening swinging movement of the damper 29. The opening of the damper 29 permits the blower 13 to move a larger amount of air through the core 14 and the ambient temperature in the passage 12 will consequently drop and the element 44 will cause a return counterclockwise swinging movement of the arm 50 and, when the arm approaches or reaches the neutral position 58, the switch 45 will be opened to stop the power device 30 and leave the damper 29 in the opened or partially opened position to which it has just been moved.

If the ambient temperature in the passage 12 decreases a predetermined amount, due either to a decreased amount of cooling needed for the core 14 or to an excessive amount of cooling air being moved through the core, the element 44 will respond to such decreased ambient temperature and the arm 50 will be swung in a counterclockwise direction away from the neutral position 58 to cause closing of the switch 46 while the switch 45 remains open. The closing of the switch 46 will cause running of the power device 30 in the direction to swing the damper 29 in the closing direction to thereby decrease the amount of cooling air traversing the core 14. When the element 44 responds to such resulting decreased flow of cooling air, the arm 50 will be swung back to the neutral position 58 causing opening of the switch 46 with the result that the power device 30 will be stopped to leave the damper 29 in the closed or partially closed position to which it has just been moved.

During the flexing of the element 44, in response to the temperature changes occurring in the passage 12 as the result of the variations in the amount of cooling air, the arm 50 may move across and beyond the neutral position 58 and cause closing of one or the other of the switches 45 and 46 to tend to correct any excessive movement of the damper 29 which may have taken place. These movements or oscillations of the arm 50 across and beyond the neutral position will be akin to a hunting function by which a self-seeking of a final and correct damper setting will be achieved and which final damper position will correspond with final position of the arm 50 substantially on the neutral line 58.

By the functioning of the control switches 45 and 46 in response to the action of the bimetal element 44 as just above described, it will be seen that a modulating control for the flow of cooling air will be provided by the damper device 15 such that the amount of air traversing the core 14 will be automatically varied to suit the requirements of the latter in such a way that the air leaving the core will be maintained at or near a substantially constant temperature. By reason of this automatic control for the flow of cooling air as provided by this invention, the blower 13 can be of an available standard size or capacity and likewise the core 14 can be of an available standard size or capacity. When the blower 13 and the core 14 can be of such an available size or standard capacity, they can be obtained at less expense than if they were designed and constructed of the exact or special size and capacity needed for a given air conditioning or refrigerating system. The adaptability of the blower 13 and the core 14 to the requirements of various air conditioning and refrigerating systems is thus made possible by the provision of the damper means 15 and the thermostat device 16 in the above-described unit 10.

The thermostat device 16 also comprises a third control switch 60 which is of a sensitive or micro-switch type having a projecting actuating stem 61. The third switch 60 is supported by the plate 43 adjacent the calibrating scale 55, and the position of this switch along the scale is indicated by a pointer 62 which is movable with the switch and relative to the scale. The switch 60 is a normally-closed switch which is located in the energizing or control circuit of the driving motor 23 for the blower 13. For co-operation with the third switch 60, the arm 50 of the bimetal element 44 is provided with a thrust portion 64 which is engageable with the actuating pin 61 to cause opening of this switch.

If the variation in the amount of cooling air traversing the core 14 as produced by the closing actuation of the damper means 15 is insufficient to prevent excessive cooling of the core, the response of the bimetal element 44 to the lowered ambient temperature will be sufficient to swing the actuating portion 64 into engagement with the pin 61 and cause opening of the third switch 60. The opening of the switch 60 will stop the driving motor 23 of the blower 13 to interrupt the flow of cooling air through the core until the ambient temperature in the passage 12 increases to move the actuating portion 64 away from the pin 61, whereupon the switch 60 will be reclosed to cause re-energization of the driving motor 23 and the flow of cooling air through the core 14 by the blower will be restored. The third control switch 60 thus supplements the damper control switches 45 and 46 in causing the desired regulation of the flow of cooling air through the core 14.

To provide for calibration of the thermostat device 16 with respect to the characteristics and capacity values of the blower 13 and the core 14 with which it is to be used, the thermostat device is provided with a first movable adjusting member 65 associated with the bimetal element 44 and a second movable adjusting member 66 associated with the third control switch 60. The adjusting members 65 and 66 are in the form of sector plates swingable relative to the support plate 43 and having teeth or serrations 65ᵃ and 66ᵃ extending along the arcuate outer edges thereof. As shown in Figs. 3 and 4, the sector members 65 and 66 are located in a position parallel to the support plate 43 and in overlapping relation to each other.

The sector member 65 is swingably mounted on a fixed pivot pin 68 of the support plate 43 and is retained on the latter as by a retaining screw 69 engaged in a groove 70 of the pivot pin. The sector member 65 carries an anchor bracket 71 which is suitably attached thereto and on which the held inner end 48 of the bimetal element 44 is suitably clamped or secured.

The sector member 66 is also swingably mounted on the pivot pin 68 and is separated from the support plate by a spacer element 73. The sector member 66 is swingable independently of the sector member 65 and carries a support arm 74 on which the third control switch 60 is mounted.

By swinging of the sector member 65, the arm 50 of the bimetal element 44 and the control switches 45 and 46 can be adjustably moved along the calibrating scale 55 to any desired setting indicated by a pointer 75 provided on the arm and, likewise, by swinging of the sector member 66, the third control switch 60 can be shifted along the scale 55 to any setting desired for such third control switch. The sector members 65 and 66 are retained in the settings to which they have been adjusted by a latch device 76 provided on the support plate 43 and having a latch member 77 engageable with the serrated edges of the two sector members. The latch member 77 is movable in a bracket 78 and is extended from the latter, in a direction to engage the serrated edges of the two sector members, by means of a compression spring 79.

The actuating portion 64 is of a predetermined length in relation to the characteristics of the element 44 and of the switch 60, so that one and the same calibrating or reference scale 55 can be used for calibrating or adjusting the setting of the pointer 75 and for calibrating or adjusting the location of the switch 60 as indicated by the pointer 62. The calibrating adjustments of the pointers 62 and 75 relative to the common scale 55 is accomplished by the adjusting movement of the sectors 66 and 65 as explained above.

From the construction of the unit 10 shown in the drawings and the functioning thereof as already explained above, it will be understood that this invention has provided a blower and a heat-exchanger unit of an economical form and having a wide range of usefulness in air conditioning and refrigeration systems. It will now likewise be understood that this invention has provided a novel thermostat device of a simple and practical form for use as a component of such a blower and heat-exchanger unit and also suitable for various other uses.

Figure 5:
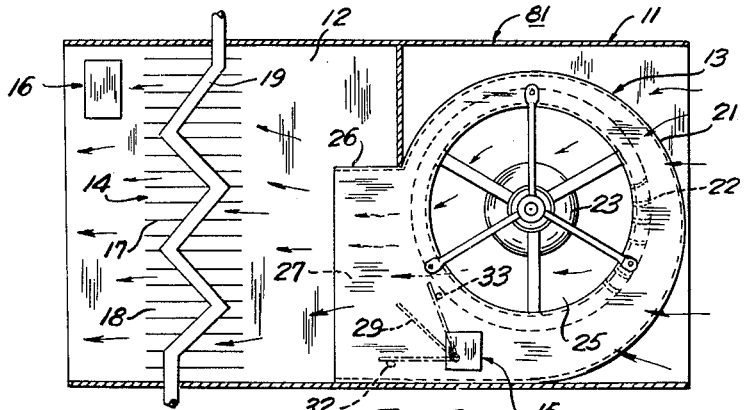
Fig. 5 is a longitudinal section similar to that of Fig. 1 but showing a modified form of blower and heat-exchanger unit.

Fig. 5 of the drawings shows a blower and heat-exchanger unit 81 of a modified form which consists of the same components as the unit 10 but with the components in a different arrangement in that the core 14 is located on the discharge side of the blower instead of on the air intake side thereof.

Figure 6:
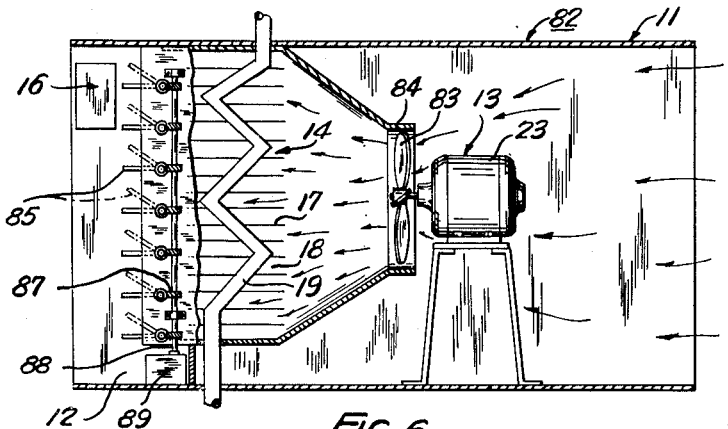
Fig. 6 is a similar longitudinal section showing another modified unit.

Fig. 6 of the drawings shows another modified blower and heat-exchanger unit 82 which comprises the same components as the units 10 and 81 but in which the air impelling means is in the form of a propeller fan 83 instead of a centrifugal blower wheel and is located in a shroud ring 84 instead of in a scroll-shaped casing. The damper means of the unit 82 also differs from the damper means 15 in that it comprises a group of louvers or shutters 85 adjacent the core 14 and here shown as being located on the air delivery side of the latter. The dampers 85 are movable to different control positions by suitable gearing 87 driven by a shaft 88 projecting from the power device 89.

The functioning of the modified units 81 and 82 of Figs. 5 and 6 is substantially the same as that of the above-described unit 10 and accomplishes the same automatic regulation of the flow of cooling air through the heat-exchanger core 14.

Although the novel thermostat device of this invention has been illustrated and described hereinto a somewhat detailed extent, it will be understood, of course, that the invention is not to be regarded as being limited correspondingly in scope but includes all changes and modifications coming within the terms of the claims hereof.

Having described my invention, I claim:

1. A thermostat device comprising, support means, temperature responsive means responsive to ambient air temperature and having a held portion and a movable portion, means providing a reference point on said support means, said movable portion being movable by said responsive means in one direction relative to said reference point in response to an increase in said ambient temperature and movable in the opposite direction in response to a decrease in said ambient temperature, a pair of electric switches associated with said responsive means, one of said switches being actuatable to a closed condition in response to movement of said movable portion in said one direction away from said reference point and the other of said switches being actuatable to a closed condition in response to movement of said movable portion away from said reference point in said opposite direction, both of said switches being in the open condition when said movable portion is at said reference point, movable anchor means connecting said held portion with said support means and providing for adjustably shifting said movable portion relative to said reference point, a third switch comprising a complete switch unit and having a movable actuating member engageable by said movable portion for actuating said third switch in response to a predetermined extent of movement of said movable portion away from said reference point in said one direction, and a movable carrier supporting said third switch as said complete unit and providing for adjustable positioning of said unit relative to said reference point.

2. A thermostat device comprising, a support, a spiral bimetal element having an inner end connected with said support and a free outer end, a substantially radial arm connected with said outer end and swingable by the latter relative to a neutral position in response to flexing of said element, a pair of first and second mercury-type switches carried by said arm, the first of said switches being actuatable to a desired circuit control condition in response to movement of said arm in a first direction away from said neutral position and the other of said switches being actuatable to a desired circuit control condition in response to movement of said arm away from said neutral position in the opposite direction, a third switch on said support at a location spaced from said neutral position and having a movable actuating member, and thrust means movable with said arm into switch actuating co-operation with said member for actuating said third switch in response to movement of said arm in one of said directions beyond the extent needed to actuate one of the switches of said pair.

3. A thermostat device comprising, a support, a spiral bimetal element having an inner end connected with said support and a free outer end, a substantially radial arm connected with said outer end and swingable by the latter relative to a neutral position in response to flexing of said element, a pair of mercury-type switches carried by said arm, one of said switches being actuatable to a closed condition in response to movement of said arm in one direction away from said neutral position and the other of said switches being actuatable to a closed condition in response to movement of said arm away from said neutral position in the opposite direction, said switches being so disposed on said arm that both switches are open when said arm is at said neutral position, a normally-closed third switch on said support and arcuately spaced from said neutral position in said one direction, and thrust means movable with said arm into co-operation with said third switch to cause opening thereof in response to movement of said arm in said one direction beyond the extent needed to cause closing actuation of said one switch of said pair.

4. A thermostat device comprising, a support plate, a spiral bimetal element adjacent said plate and having a free outer end and an inner end, a substantially radial arm connected with said outer end and swingable thereby relative to a neutral position in response to flexing of said element, a pair of mercury-type switches carried by said arm, one of said switches being actuatable to a closed condition in response to movement of said arm in one direction away from said neutral position and the other of said switches being actuatable to a closed condition in response to movement of said arm away from said neutral position in the opposite direction, said switches being so disposed on said arm that both switches are open when said arm is at said neutral position, a normally-closed third switch spaced from said neutral position, thrust means movable with said arm into co-operative engagement with said third switch to open the latter in response to movement of said arm in said one direction beyond the extent needed to cause closing actuation of said one switch of said pair, and an adjusting member pivoted on said plate and having said third switch mounted thereon whereby the spacing of said third switch from said neutral position can be varied.

5. A thermostat device comprising, a support plate, a spiral bimetal element adjacent said plate and having a free outer end and an inner end, a substantially radial arm connected with said outer end and swingable thereby relative to a neutral position in response to flexing of said element, a pair of mercury-type switches carried by said arm, one of said switches being actuatable to a closed condition in response to movement of said arm in one direction away from said neutral position and the other of said switches being actuatable to a closed condition in response to movement of said arm away from said neutral position in the opposite direction, said switches being so disposed on said arm that both switches are open when said arm is at said neutral position, a normally-closed third switch, thrust means movable with said arm into co-operative engagement with said third switch to open the latter, a first adjusting member pivoted on said plate and having said inner end attached thereto, and a second adjusting member pivoted on said plate and having said third switch mounted thereon.

6. A thermostat device as defined in claim 5 and wherein said first and second adjusting members are overlapping sector members having toothed edges, and wherein a common holding means on said plate is in co-operative engagement with said toothed edges.

7. A thermostat device comprising, support means, a temperature responsive element on said support means and having a movable portion, a mercury-type switch carried by said movable portion and actuatable in response to a predetermined extent of movement thereof in a given direction, and another switch mounted on said support means and comprising a complete switch unit having a movable actuating member engageable by said movable portion for actuation of such other switch thereby in response to movement of said movable portion in said given direction beyond said predetermined extent.

References Cited in the file of this patent

UNITED STATES PATENTS

| | | |
|---|---|---|
| 1,764,346 | Phelan et al. | June 17, 1930 |
| 1,793,011 | Ray | Feb. 17, 1931 |
| 1,881,950 | Rayfield | Oct. 11, 1932 |
| 2,262,341 | Shaw | Nov. 11, 1941 |
| 2,315,533 | Malone | Apr. 6, 1943 |
| 2,357,533 | Meza | Sept. 5, 1944 |
| 2,529,592 | Boyle | Nov. 14, 1950 |
| 2,567,112 | Kagan | Sept. 4, 1951 |
| 2,580,149 | Woods | Dec. 25, 1951 |
| 2,759,070 | Ray | Aug. 14, 1956 |
| 2,855,484 | Kreuter | Oct. 7, 1958 |